United States Patent [19]

Ozawa et al.

[11] Patent Number: 4,722,844

[45] Date of Patent: Feb. 2, 1988

[54] PROCESS OF STABILIZING ASPARTAME SWEETNESS IN WATER-CONTAINING FOODS

[75] Inventors: Toshiyuki Ozawa, Kanagawa; Hideki Hattori, Yokohama, both of Japan

[73] Assignee: Ajinomoto Co., Inc., Tokyo, Japan

[21] Appl. No.: 769,778

[22] Filed: Aug. 28, 1985

Related U.S. Application Data

[63] Continuation of Ser. No. 521,556, Aug. 9, 1983, abandoned.

[30] Foreign Application Priority Data

Aug. 17, 1982 [JP]   Japan ................. 57-142274
Aug. 17, 1982 [JP]   Japan ................. 57-142275

[51] Int. Cl.$^4$ .................... A23L 1/236; A23L 1/06; A23L 1/187; A23G 3/30
[52] U.S. Cl. ...................................... 426/3; 426/548; 426/573; 426/579; 426/586; 426/804
[58] Field of Search .................. 426/548, 3, 573, 579, 426/586, 629, 658, 519, 804

[56] References Cited

U.S. PATENT DOCUMENTS

| | | | |
|---|---|---|---|
| 3,955,000 | 5/1976 | Baggerly | 426/548 |
| 3,962,468 | 6/1976 | Pischke et al. | 426/96 |
| 3,982,023 | 9/1976 | Bahoshy et al. | 426/3 |
| 4,059,706 | 4/1977 | Pischke et al. | 426/96 |
| 4,439,460 | 3/1984 | Tsau et al. | 426/548 |

*Primary Examiner*—Elizabeth Weimar
*Attorney, Agent, or Firm*—Oblon, Fisher, Spivak, McClelland, & Maier

[57] ABSTRACT

A sweetening agent or sweetened food which comprises α-L-aspartyl-L-phenylalanine methyl ester (Aspartame) and an aqueous dispersing agent, wherein the Aspartame is present in an amount sufficient to saturate the aqueous dispersing agent and further to provide undissolved Aspartame, is disclosed along with a method for producing such foods and sweetening agents.

5 Claims, 3 Drawing Figures

PROCESS OF STABILIZING ASPARTAME SWEETNESS IN WATER-CONTAINING FOODS

This application is a continuation of application Ser. No. 521,556, filed Aug. 9, 1983.

BACKGROUND OF THE INVENTION

1. Field of the Invention

This invention relates to sweetened foods and to liquid sweetening agents which contain Aspartame.

2. Description of the Prior Art

α-L-Aspartyl-L-phenylalanine methyl ester (hereafter referred to as Aspartame) is a low calorie sweetening agent which has a sweetness of good quality and a sweetening intensity about 200 times that of sucrose. Hence, Aspartame is expected to be of great utility in the preparation of foods.

Nevertheless, several problems still exist relating to the handling and storage stability of compositions containing Aspartame. For example, it is known that in foods containing water, particularly foods having a pH of 5.5 or higher or a pH of 2.0 or less, Aspartame decomposes to give a diketopiperazine derivative having no sweet taste, although this decomposition product is nontoxic and completely safe. Similar decomposition takes place in foods intended for long-term storage.

Attempts to improve the stability of Aspartame in water have been made. For example, Aspartame has been covered with gelatin or with a component having a high melting point or one which is water insoluble. Furthermore, it is known to adjust the pH of the composition containing Aspartame to the range in which Aspartame is most stable. These methods are illustrated by chewing gum compositions containing Aspartame in which Aspartame is incorporated in the gum along with an ester gum coating and in which the pH of the water extract of the gum is adjusted to be within the stable range of Aspartame.

However, the use of these conventional methods is impractical in certain foods. For example, the pH adjustment of certain foods is restricted in view of the affect that this adjustment has on the taste of the foods. Likewise, inclusion of insoluble components or components having a high melting point unfavorably affects the manifestation of texture, flavor, sweetness, and the like in many foods. Accordingly, it is no exaggeration to say that the stability of Aspartame for use in foods having a significant water content is the most important problem which prevents putting Aspartame into general practical use.

Additionally, certain problems occur in the handling of Aspartame due to its inherent properties. For example, since Aspartame is generally in the form of needle-like minute crystals, Aspartame powder has a large specific volume and is easily scattered. Therefore, there is a risk of scattering Aspartame during handling operations, which result in the deterioration of the working conditions and at the same time causes lost due to such scattering.

Additionally, while Aspartame has the advantage of not easily absorbing moisture and thereby deliquescing, it has the disadvantage that dispersibility and solubility in water are poor. In utilizing Aspartame in various foods, there is therefore a disadvantage from the aspect of foods processing since Aspartame gives rise to undissolved lumps of powder when attempts are made to dissolve it in water. Thus, the dissolving operation is difficult and takes a long time or is accompanied by a foaming phenomenon.

On the other hand, with the increase in public interest in health and diet, the development of a low calorie sweetening agent which can replace sugar and is also good for dental health has long been sought. Apart from such a general requirement, a means for solving problems associated with conventional products employing sugar, such as browning, tackiness, etc., has long been a major subject of interest in the sweetening industry, along with the development of sweetening agents suitable for the production of beverages, ice cream, etc. In particular, the influence of the sweetening agent on the quality of the final product, the workability of the production processes, the change in the properties due to the sweetening agent, and similar factors are often important when selecting a sweetening agent, especially in beverage, ice cream, and related industries. Furthermore, in cases where a stock solution of a concentrated type is prepared beforehand and where the dilution or bottling of this concentrate is conducted separately, such as in the beverage industry, a high degree of sweetness is required since it is desirable that the volume be as small as possible in order to facilitate transport, storage, and the like. Similar considerations exist where a concentrated stock solution is supplied to a vending machine as a stock solution or a syrup.

In order to meet these varied requirements, sweetening agents such as isomerized sugar, coupling sugar, sorbitol, maltitol, stevioside, saccharin, and the like have been developed and employed. However, these sweetening agents have inherent drawbacks. For example, isomerized sugar, coupling sugar, sugar alcohol, and the like, which are satisfactory with regard to the quality of sweetness and diet, have problems such as a low degree of sweetness. On the other hand, stevioside, saccharin, and the like have a poor quality of sweetness although the degree of sweetness is high.

In the present situation, Aspartame is satisfactory both as to the quality and degree of sweetness and the safety to the diet as described above, but it has problems with the stability and workability properties as described above. Accordingly, there continues to exist a need for improvement in the dispersibility, solubility, and stability of Aspartame compositions.

SUMMARY OF THE INVENTION

Accordingly, it is an object of the present invention to provide an Aspartame composition of improved dispersibility.

Likewise, it is an object of this invention to provide an Aspartame composition having improved solubility.

It is yet another object of the invention to provide an Aspartame composition or food having good storage stability.

These and other objects of the invention as will hereinafter become more readily apparent have been accomplished by providing a sweetening agent or sweetened food which comprises α-L-aspartyl-L-phenylalanine methyl ester and an aqueous dispersing agent wherein said α-L-aspartyl-L-phenylalanine methyl ester is present in an amount sufficient to saturate said aqueous dispersing agent and further to provide undissolved α-L-aspartyl-L-phenylalanine methyl ester.

This invention also provides a process for the production of a liquid sweetening agent which comprises preparing a slurry containing α-L-aspartyl-L-phenylalanine methyl ester at a concentration higher than its solubility in an aqueous dispersing agent and subsequently mixing it with the aqueous dispersing agent.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

(FIG. 1), 34° C. (FIG. 2), and 44° C. (FIG. 3). The compositions are identified in these graphs as follows:

Figure 1:
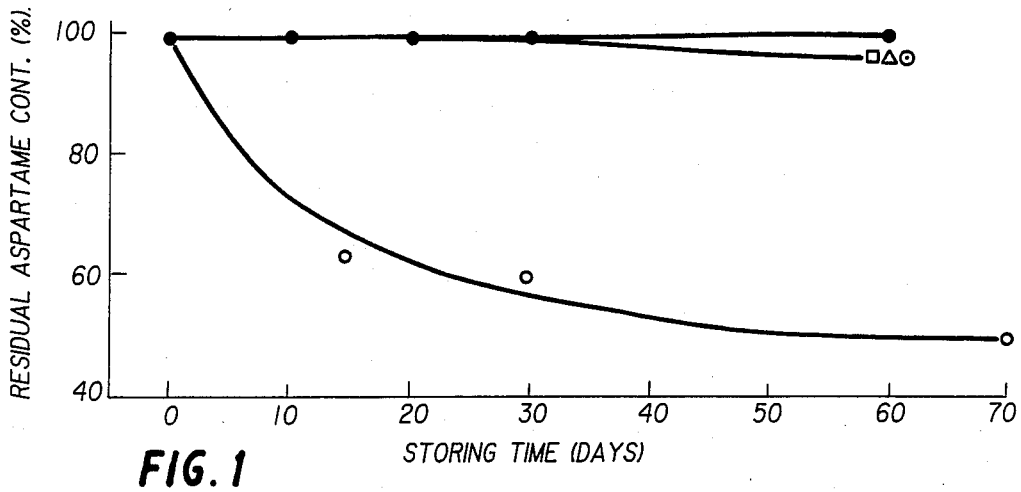
FIGS. 1-3 show the percent Aspartame remaining in the liquid sweetening agents of this invention (Examples 1 and 2) and in an aqueous Aspartame solution (50 mg/dl) at 24° C.
Figure 2:
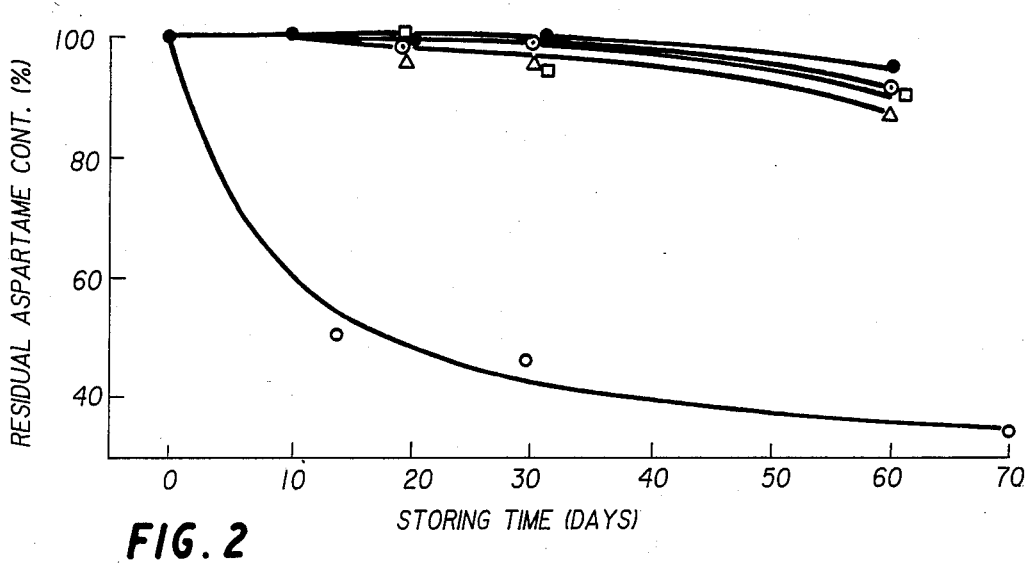
Figure 3:
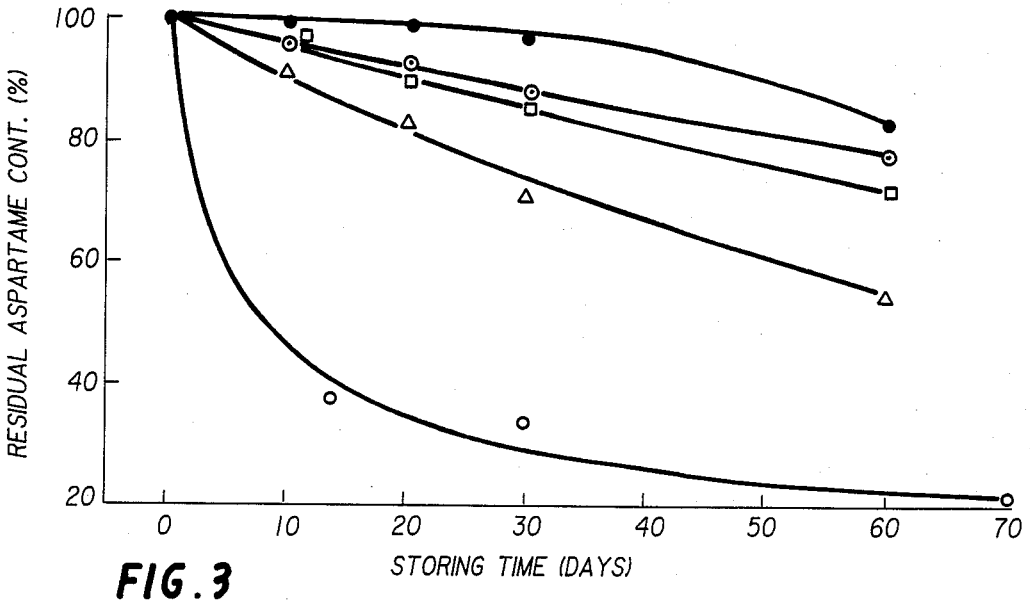

| FUJIFURAKUTO + Aspartame | △—△ |
| Sorbitol + Aspartame | ○—○ |
| SE 100 + Aspartame | □—□ |
| Coupling Sugar + Aspartame | ●—● |
| Aqueous Aspartame Solution | ○—○ |

DESCRIPTION OF THE PREFERRED EMBODIMENTS

The present inventors have studied the stability of Aspartame in water by taking into account the previously described situation involving pH and storage temperature and the affect of these circumstances on the stability of Aspartame. They have further discovered additional factors which influence the stability of Aspartame in water, namely the concentration of Aspartame and the co-presence of additional components, especially sugars. The present invention has been accomplished based on the above discovery, whereby the objects of the present invention have been accomplished by providing a sweetening agent or sweetened food which comprises Aspartame and an aqueous dispersing agent, wherein Aspartame is present in the sweetening agent or the sweetened food in an amount sufficient to saturate the aqueous dispersing agent and further to provide undissolved Aspartame. This may be described as a semi-dissolved state for Aspartame wherein Aspartame is not completely dissolved in the aqueous dispersing agent, whether that dispersing agent is an added aqueous solution or the contained water content of a food.

The dispersing agent employed in this invention refers to an aqueous solution which may contain alcohol in the amount ranging from 0 to 95%. The viscosity of the aqueous solution can range from low to high; i.e., the aqueous solution may be in the form of a cream as well as a liquid. Examples of dispersing agents are water and aqueous solutions containing ethanol, isomerized sugar, sorbitol, reduced starch hydrolyzate, coupling sugar, and the like. These components may be present alone or in combination and the aqueous solution containing them may contain any hydrophilic ingredient such as a sugar, a soluble starch or protein, an organic or inorganic acid, a soluble salt, an oleiophilic ingredient, or any other substance suitable for use in the preparation of a food.

While it is preferred to include a sugar in the dispersing agent for further improving the degree of sweetness and the stability of Aspartame, such inclusion is not required. However, when an aqueous sugar solution having a low degree of sweetness, such as isomerized sugar, sugar alcohol, reduced starch hydrolyzate, coupling sugar, or the like, is employed as the dispersing agent, the sweetening intensity of such a sweetening agent is reinforced and a product having a high degree of sweetness may be obtained. At the same time Aspartame is rendered extremely stable even in a liquid system when a sugar is included, and, even on use, Aspartame crystals are uniformly dispersed and floated in the dispersing agent and hence are excellent in water dispersibility and solubility. Thus, a sweetening agent having a high practical value as a starting material for beverages, desserts, ice cream, and the like, may be produced.

The viscosity of the liquid sweetening agent may be low without any problem if, for example, it is shaken prior to use. Preferably, a dispersing agent having a viscosity at least sufficient to maintain the floating stability of Aspartame should be used or the dispersion and floating stability of Aspartame in the dispersing agent should be enhanced by adding a thickening stabilizer; a specific gravity increasing component, such as, for example, gums such as xanthan gum, guar gum, and the like; a polysaccharide; or the like.

The amount of Aspartame to be added to the dispersing agent is such that at least a part of the Aspartame is maintained in the undissolved state. More particularly, if the dispersing agent is already in the saturated or supersaturated state as the result of another component or components, most of the Aspartame added remains undissolved. In such cases it is enough to add only a very small amount of Aspartame. However, it is also possible to add a large amount of Aspartame to prepare a composition having an extremely high degree of sweetness. Furthermore, where the dispersing agent is not saturated, it is necessary to add Aspartame in an amount at least equal to the saturation solubility in the liquid dispersing agent. In other words, the lower limit for the amount of Aspartame to be added is the amount required for making Aspartame supersaturated at any temperature from storing temperature to room temperature, while the upper limit therefor is the amount of Aspartame required according to the intended degree of sweetness. For example, where isomerized sugar (Hi-fructose), sorbitol, reduced starch hydrolyzate and coupling sugar are employed singly, the amounts of Aspartame to be added are 0.45%, 0.35%, 0.35% and 0.33% or more respectively, but it should be noted that these are only guidelines and as long as at least a part of Aspartame remains undissolved, amounts lower than these limits may well be regarded enough.

The aforesaid dispersing agents may be employed either singly or in combination of two or more thereof, and further other seasoning components (for example, flavoring substance such as sodium L-glutamate, 5'-nucleotide and the like; sweetening substances such as stevioside, saccharin, and the like; organic acids; amino acids; peptides; extracts; fragrance; spices; coloring agents; inorganic substances such as calcium, magnesium, etc.; vitamins; and oils and fats) may also be present. Where oils and fats are co-present, it is possible to present a product as an oil-in-water or water-in-oil emulsion.

The method of producing a liquid sweetening agent of this invention is not particularly restricted. For example, a process which simply comprises directly adding Aspartame to a dispersing agent and mixing to prepare a slurry may be employed, or of course a process which comprises warming a dispersing agent, then adding Aspartame thereto, mixing, and cooling may also be employed. However, in order to uniformly disperse Aspartame while preventing the inclusion of bubbles, the following process is desireable. That is, a slurry comprising Aspartame and water (and/or a part of a dispersing agent) is prepared and then mixed with the total amount (or the rest) of the dispersing agent. On such occasions, the slurry is preferably prepared beforehand by directly mixing and homogenizing with a part of the dispersing agent, or by homogenizing Aspartame and water, then mixing and homogenizing with a part of the dispersing agent. Thereafter, this is combined with the rest of the dispersing agent in a large amount and vacuum mixed. By this procedure a liquid sweetening agent in which Aspartame particles are uniformly dispersed may be produced while preventing the formation of bubbles.

By the liquid sweetening agent as used in this invention is meant to include all the flowing to semi-flowing types, such as a liquid, paste, soft or hard cream form, etc. For example, in the case of a paste or cream form, the workability on mixing with highly viscous starting materials is excellent, and the composition is suitable for the production of ice cream, etc.

Since the liquid sweetening agent according to this invention has an extremely high storage stability of Aspartame as compared with a solution in which Aspartame is dissolved at a low concentration, the loss in sweetness is small, and the composition may be presented as a liquid sweetening agent of a high degree of sweetness. In addition, since its dispersibility and solubility in water are remarkably improved over the Aspartame single product, a wide range of applications may be expected as sweetening agents suitable for such uses in beverages, ice cream, syrups, vending machines, etc.

In addition to compositions useful as sweeting agents, this invention also provides sweetened foods in which Aspartame is present in a semi-dissolved state in the contained water content of the food. That Aspartame is present in the semi-dissolved state in the contained water content of a food means that Aspartame is present in an amount more than can be dissolved in the water present, and hence at least a part thereof is undissolved and dispersed. More specifically, there may be mentioned a case where the water content is saturated or supersaturated with other soluble components, and thus most of the Aspartame is undissolved and dispersed. Likewise, a system may exist in which the water content is not saturated with other components. Here Aspartame is present in an amount more than required for saturation, and thus a part of Aspartame is dissolved while the rest is undissolved and dispersed.

Where Aspartame is present in the semi-dissolved state in the water content, the stability of Aspartame in water is enhanced. This tendency is more remarkable when sugar is co-present.

As the sugar, there may be employed monosaccharides and oligosaccharides such as disaccharides, trisaccharides and higher saccharides, including glucose, fructose, sucrose, maltose, lactose, raffinose etc.; a sugar alcohol such as sorbitol, isomaltitol, maltitol, etc.; a mixed sugar such as isomerized sugar, coupling sugar, etc.; a starch hydrolyzate prepared by acid or enzyme and its reduced product; and similar sugars. Among these, if a sugar having a low degree of sweetness as compared with sucrose, i.e., a so-called low sweet sugar, is employed, the sweetening intensity is reinforced by Aspartame, and a high stability of Aspartame may be obtained without adverse affects. Especially, if a sugar containing no glucose or fructose, such as, for example, a sugar alcohol, a reduced starch hydrolyzate, a coupling sugar, or the like, is employed, browning does not proceed, and the stability of Aspartame in water is enhanced.

Where sugar is co-present, if the water content of the food has been already saturated by the sugar or the co-present other components, it is enough to add Aspartame in varied amounts from extremely small to large depending on the intended degree of sweetness. Also in the case where the saturation has not been reached with the sugar or even by the co-presence of the other components, it is enough to adjust the amount of Aspartame depending on the intended degree of sweetness, but it is required that Aspartame is added at least in sufficient amount to saturate the water content.

The sweetened foods of this invention include all which have a water content. Examples thereof include chewing gum, jelly, jam, juice, filling, bean jam, cream, pudding, sweet jelly of beans, mousse, ice cream, sauce, etc. The application of this invention to foods having a high degree of sweetness (10 g/dl or higher calculated as sucrose) is preferable.

Although the method for adding Aspartame is not particularly restricted, it is desired that the dissolved part and undissolved part of Aspartame are uniformly dispersed and that the undissolved part is dispersed in a state where the degree of sweetness thereof is diluted with a suitable dispersing agent. More specifically, there may be mentioned, for example, a method which comprises adding Aspartame to water, liquid sugar and other aqueous starting materials to form a saturated solution or a slurry, and then mixing it with the rest of the starting materials. Depending on necessity, Aspartame may then be added and mixed in a powder or granule form which had been adjusted to a suitable sweetening intensity with an appropriate dispersing agent. Additionally a method which comprises dispersing a solution of Aspartame and sugar and then mixing with other starting materials may be used as may any other suitable method. Preferably, the addition of Aspartame is carried out after the end of the heating step or during the heating step so as to minimize the heating of Aspartame, and the rest of the method may be conducted in a conventional manner.

With the sweetened foods of this invention there is no loss in sweetness, since Aspartame is stable for a prolonged time even when water is co-present. Further, since Aspartame has a good quality of sweetness, a flavor improving effect is obtained as is, in the case of chewing gum, an effect of lengthening the sweetness time. Thus, various sweetened foods satisfactory in taste, flavor, etc., may be obtained according to the present invention.

The invention now being generally described, the same will be better understood by reference to certain specific examples which are included herein for purposes of illustration only and are not intended to be limiting of the invention or any embodiment thereof, unless specified.

EXAMPLE 1

Seventy parts by weight of water was added to 35 parts by weight of Aspartame and homogenized on a homogenizer. Then 70 parts by weight of FUJIFURAKUTO (isomerized sugar produced by Nippon Shokuhin Kako K.K.) was added and the resulting composition further homogenized to prepare a slurry containing Aspartame, which was then vacuum mixed with 2000 parts by weight of FUJIFURAKUTO using a ROBOT-COUPE (manufactured by TK. SUPPLIES K.K) for 5 minutes to prepare a liquid sweetening agent of this invention.

Solubility of Aspartame in Dispersing Agent

The solubility of Aspartame in FUJIFURAKUTO at 30° C. was 0.49 g/dl. Further, the concentration of Aspartame in the liquid sweetening agent obtained above was 1.7 g/dl.

Floating Stability of Liquid Sweetening Agent

The liquid sweetening agent was placed in a 20 ml cylinder and left at room temperature for 30 days, at which time it was observed for the presence of sedimentation. The viscosity of the liquid sweetening agent was 425 cp, and no sedimentation of Aspartame was found.

Storage Stability of Liquid Sweetening Agent

The percent Aspartame remaining at 24° C. and 34° C. was measured. At 24° C., 100% remained after 30 days and 100% even after 60 days. At 34° C., 94.2% remained after 30 days and 88.5% after 60 days. On the other hand, in the case of a 0.05% aqueous Aspartame solution (control), the percents Aspartame remaining were 22.7% and 15.3% after 60 days at 24° C. and 34° C. respectively.

Solubility of Liquid Sweetening Agent

Fifty grams of the liquid sweetening agent (the content of Aspartame 0.85 g) was added to 500 ml of warm water (50° C.) with stirring (200 rpm), and the time for complete dissolution was measured (70 seconds). As a control, 0.85 g of Aspartame undiluted powder was added to 500 ml of warm water, and the time to complete dissolution was measured as above to find that dissolution required 360 seconds.

From the above results, the liquid sweetening agent of this invention was excellent in storage stability, solubility, etc.; had a degree of sweetness 5.9 times that of the FUJIFURAKUTO single product; and exhibited a quality satisfactory as a liquid sweetening agent.

EXAMPLE 2

Liquid sweetening agents were prepared using the same conditions and procedures as in Example 1 except that the FUJIFURAKUTO had been replaced by Sorbitol (produced by Ajinomoto Co., Inc.), SE 100 (reduced starch hydrolyzate produced by Matsutani Kagaku Kogyo K.K.) and Coupling Sugar (produced by Hayashi Genseibutsu Kagaku Kenkyusho) respectively, and their properties were measured.

Solubility of Aspartame in Dispersing Agents

| Dispersing Agent | Solubility of Aspartame in Dispersing Agent | Concentration of Aspartame in Liquid Sweetening Agent |
| --- | --- | --- |
| "Sorbitol" | 0.39% | 1.7% |
| "SE 100" | 0.37 | 1.6 |
| "Coupling Sugar" | 0.35 | 2.9 |

Floating Stability of Liquid Sweetening Agent

No sedimention of Aspartame was observed for Sorbitol, ES 100, or Coupling Sugar. The viscosities were 255 cp for Sorbitol, 4,020 cp for SE 100 and 3,850 cp for Coupling Sugar.

Storage Stability of Liquid Sweetening Agent

| | Percent Aspartame Remaining | | | |
| --- | --- | --- | --- | --- |
| | at 24° C. | | at 34° C. | |
| Dispersing Agent | 30 days | 60 days | 30 days | 60 days |
| "Sorbitol" | 98.8% | 96.4% | 98.8% | 91.0% |
| "SE 100" | 100 | 95.6 | 94.3 | 89.9 |
| "Coupling Sugar" | 100 | 100 | 100 | 95.1 |

Solubility of Liquid Sweetening Agent

| Dispersing Agent | Time to Dissolve |
| --- | --- |
| "Sorbitol" | 70 sec. |
| "SE 100" | 70 sec. |
| "Coupling Sugar" | 70 sec. |

As evident from the above data, in the cases where "Sorbitol", "SE" 100 and "Coupling Sugar" were employed as dispersing agents, good results similar to those in Example 1 were also obtained.

EXAMPLE 3

Fifty parts by weight of sucrose and 50 parts by weight of water were heated to 60° C. and then homogenized with 4 parts by weight of Aspartame and 8 parts by weight of water to obtain a slurry, to which was added 0.2 parts by weight of xanthan gum. The resulting composition was homogenized to obtain a liquid sweetening agent.

The properties of this liquid sweetening agent were measured, and the results set forth in the following table were obtained.

| Aspartame Solubility | | | 0.46% |
| --- | --- | --- | --- |
| Aspartame Concentration | | | 1.79% |
| Floating Stability | | | Aspartame does not settle |
| Viscosity | | | 5400 cp |
| Storage | 24° C. | 30 Days | 100% |
| Stability | | 60 Days | 95.3% |
| (Percent Aspar- | 34° C. | 30 Days | 98.4% |
| tame Remaining) | | 60 Days | 95.1% |
| for dissolution | | | 50 sec. |

EXAMPLE 4

Formulation of Orange Soda Syrup

| Aspartame | 6 g |
| --- | --- |
| Citric Acid | 14.3 g |
| Orange Flavor Base W-600 | 10 ml |
| Yellow No. 4, 1% Solution | 10 ml |
| Water | 142 ml |

The aforesaid formulation of ingredients was mixed and homogenized to obtain a 1:40 concentrate orange syrup for carbonated beverages.

The workability and properties of this syrup were measured, and the following results were obtained.

Workability of Concentrated Orange Syrup

Since the concentrated syrup had a high degree of sweetness, both metering operation and transport operation were simply conducted, and it showed good workability in both a pre-mix process and post-mix process.

Storability of Concentrated Orange Syrup

| | Percent Aspartame Remaining | |
|---|---|---|
| | Storing Temperature | |
| Storing Days | 24° C. | 34° C. |
| 30 Days | 97.0% | 92.3% |
| 60 Days | 90.1% | 87.6% |

EXAMPLE 5

Thirty parts by weight of Aspartame was added to 1000 parts by weight of a mixed liquid sugar obtained by mixing "Sorbitol" and "SE 100" in a 1:1 ratio by weight, and similar procedures to those in Example 1 were conducted to prepare a liquid sweetening agent.

The properties of this liquid sweetening agent were measured, and the results set forth in the following table were obtained.

| Aspartame Solubility | | | 0.48% |
|---|---|---|---|
| Aspartame Concentration | | | 2.84% |
| Floating Stability | | | Aspartame does not settle |
| Storage | 24° C. | 30 Days | 100% |
| Stability | | 60 Days | 98.6% |
| (Percent Aspar- | 34° C. | 30 Days | 99.0% |
| tame Remaining) | | 60 Days | 96.0% |
| Time for dissolution | | | 70 sec. |

EXAMPLE 6

| Dried string agar | 24 g |
|---|---|
| Maltitol (produced by Towa Kasei K. K.) | 150 g |
| Aspartame (obtained by pelletizing using sucrose as dispersing agent) | 9 g |
| Unsweetened bean jam | 1500 g |
| Water | 900 g |

Using the above formulation, the agar which had been dipped in water beforehand was washed with water and then squeezed and heated with added water to dissolve the agar, after which the maltitol was added. The resulting mixture was passed once through a sieve after which heating was continued. When it was boiled down at about 104° C., the unsweetened bean jam was added, kneaded, and then cooled to 90° C. while continuing stirring. Then Aspartame was added, and the composition was adequately stirred to dissolve and then was poured into a mold and cooled.

When this sweetened paste of beans was stored at 34° C. for 120 days, the percent Aspartame remaining was 93.7%. Organoleptically, an evaluation indicating that it was of refreshing sweetness and preferable was obtained.

EXAMPLE 7

| Tomato puree | 10 l |
|---|---|
| Aspartame | 12 g |
| Coupling sugar | 1000 g |
| Pectin | 15 g |
| Table salt | 90 g |
| Acetic acid (5% concentration) | 400 ml |
| Onion | 200 g |
| Cinnamon | 3.1 g |
| Laurel | 1.6 g |
| Celery seed | 0.7 g |
| Clove | 0.7 g |
| Nutmeg | 2.0 g |
| Red pepper | 2.0 g |
| White pepper | 2.0 g |

To 10 l of the tomato puree obtained by processing in the conventional manner was added 200 g of minced onion. The mixture was concentrated, and then all the rest of the above starting materials which had been uniformly mixed using a food cutter were added to give flavor to it, whereby tomato ketchup was obtained.

This tomato ketchup and (as a control) another tomato ketchup obtained by not adding the coupling sugar but increasing the amount of the pectin to adjust the viscosity were stored at 34° C. for 90 days. When the percents Aspartame remaining were measured, the product of this invention shows 87.0% while the control showed 76.7%. Organoleptically, the ketchup of the invention was evaluated to be preferred because it had refreshing sweetness and, especially from the aspect of flavor, it had a straight mild taste.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A process for stabilizing the sweetness of a water-containing food, which comprises adding α-L-aspartyl-L-phenylalanine methyl ester to said food and uniformly dispersing said α-L-aspartyl-L-phenylalanine methyl ester throughout said food, wherein the amount of α-L-aspartyl-L-phenylalanine methyl ester is effective to supersaturate the contained water content of said food and to stabilize the sweetness of said food.

2. The process of claim 1, wherein said stabilization is for at least 10 days.

3. The process of claim 1, wherein said food is a chewing gum, jelly, jam, filling, bean jam, pudding, sweet jelly of beans, mousse or ice cream.

4. The process according to claim 1, wherein said α-L-aspartyl-L-phenylalanine methyl ester is in the form of a supersaturated dispersion.

5. The process according to claim 1, wherein said contained water is saturated with α-L-aspartyl-L-phenylalanine methyl ester, or one or more components selected from the group consisting of glucose, sucrose, fructose, isomerized sugar, sugar alcohol, and reduced starch hydrolyzate.

* * * * *